April 15, 1941.   G. D. GULER   2,238,688
AIR CONDITIONING SYSTEM
Filed June 16, 1938   2 Sheets-Sheet 1

Inventor
George D. Guler
By
George H. Fisher
Attorney

April 15, 1941.  G. D. GULER  2,238,688
AIR CONDITIONING SYSTEM
Filed June 16, 1938  2 Sheets-Sheet 2

Inventor
George D. Guler
By
George H. Fisher
Attorney

Patented Apr. 15, 1941

2,238,688

UNITED STATES PATENT OFFICE 2,238,688

AIR CONDITIONING SYSTEM

George D. Guler, Philadelphia, Pa., assignor to Minneapolis-Honeywell Regulator Company, Minneapolis, Minn., a corporation of Delaware Application June 16, 1938, Serial No. 214,033

11 Claims. (Cl. 257—3)

This invention relates to an air conditioning system and more particularly to an air conditioning system wherein a plurality of zones are conditioned by a single air conditioning apparatus, the system being so arranged that the same apparatus may be utilized for cooling one zone when a different zone is calling for heating.

It is an object of this invention therefore to provide an air conditioning system having both heating and cooling means, the system being so arranged that the conditions of a plurality of zones are individually controlled by the same system and wherein one zone may be cooled by the system while another zone may be heated if conditions so require.

Another object of the invention is the provision of an air conditioning chamber divided into a pair of sub-chambers, one sub-chamber being provided with heating means and the other sub-chamber being provided with cooling means, with means for circulating fresh and return air through the sub-chambers and into a space or spaces to be heated, with means for controlling the proportions of fresh and return air according to the temperature of the mixture of fresh and return air, plus means for operating the heating means only when the mixture temperature drops below a predetermined value, means for operating the cooling means only when the mixture temperature is above a predetermined value, means for operating both the heating and cooling means when the mixture temperature is between these values, and means for proportioning the amount of air passing through the sub-chambers into each space according to the requirements of the space.

In carrying out my invention I provide an air conditioning chamber divided into a pair of sub-chambers, one of the sub-chambers having heating means, and the other of the sub-chambers having cooling means therein. Each of the sub-chambers is divided into a plurality of passageways and one passageway of each sub-chamber is connected by a duct to a zone to be conditioned. By proportioning the relative amounts of the air passing through the chamber having the heating means and the chamber having the cooling means to each duct, and controlling the operation of the heating and cooling means in accordance with the temperature of the air being delivered thereto, the conditions in each zone may be effectively controlled.

Other objects and advantages may become apparent upon a study of the specification, claims, and appended drawings wherein like reference characters represent like parts in the two views and wherein:

Figure 1:
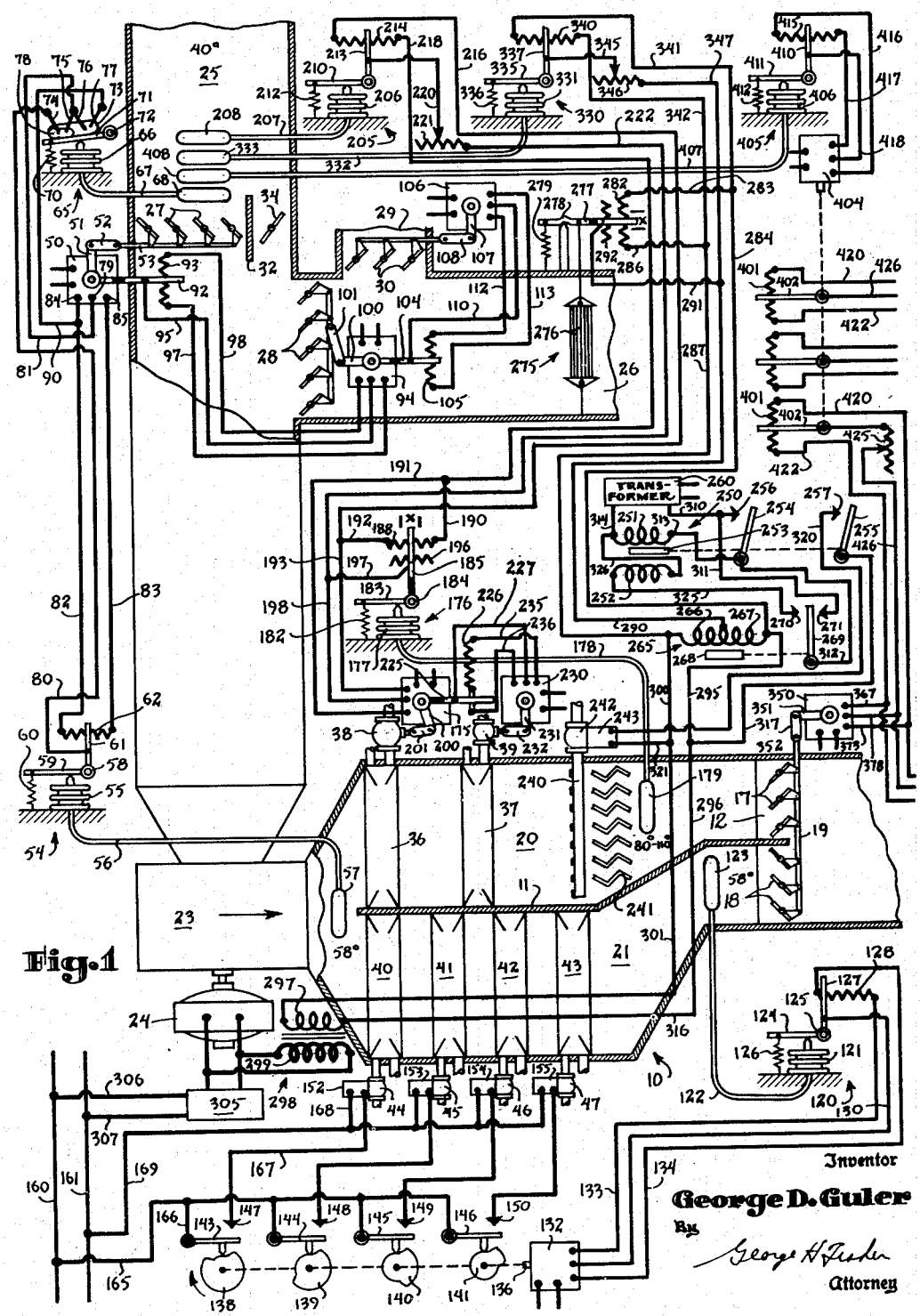
Figure 1 is a schematic diagram of my air conditioning system.
Figure 2:
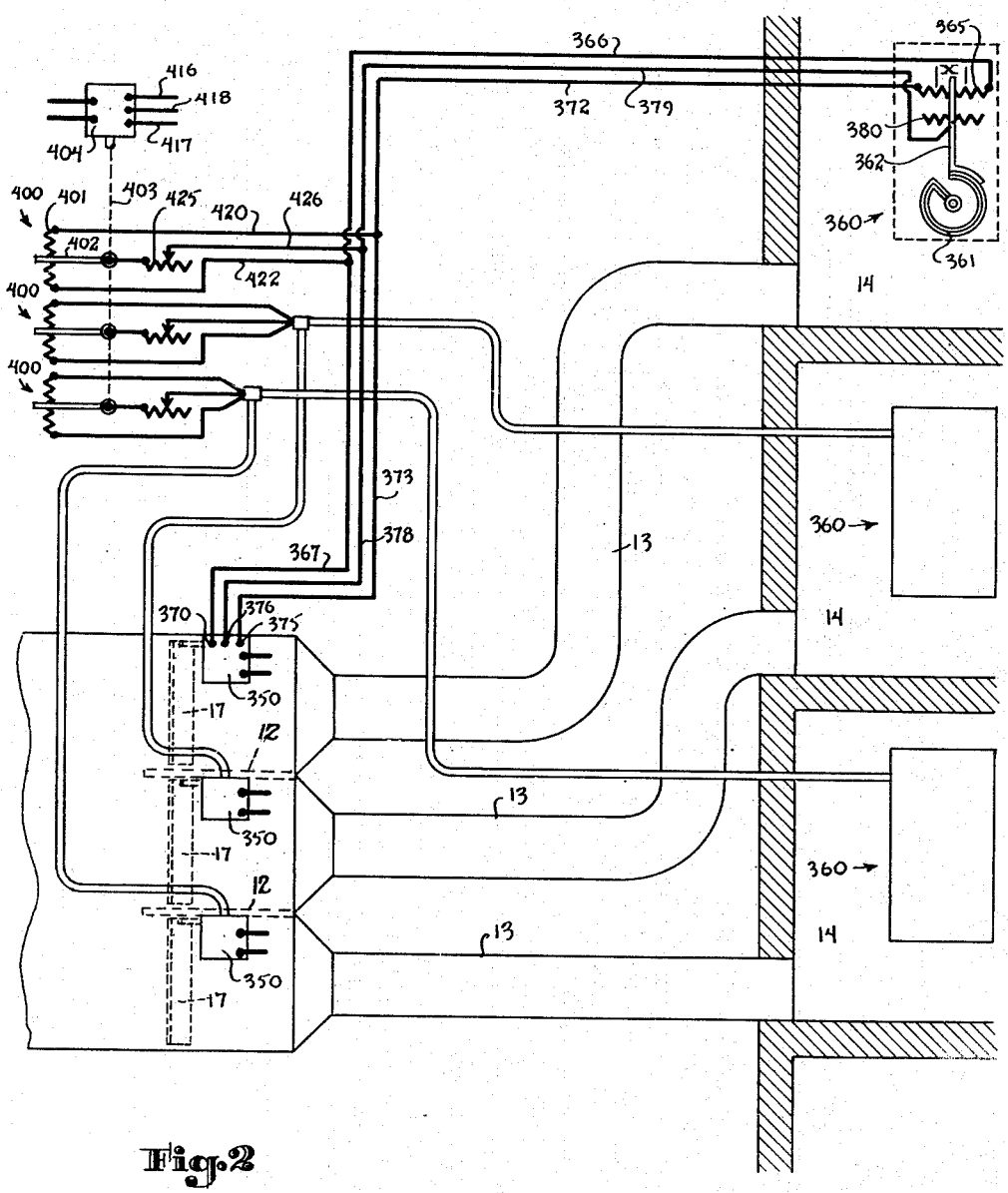
Figure 2 is a schematic diagram illustrating the manner in which the conditioned air is delivered to the various zones to be conditioned.

Referring now to the drawings, an air conditioning chamber is represented by the reference character 10. This chamber is divided into a pair of sub-chambers 20 and 21 by means of a wall 11 and as will be seen with reference to Figure 2 the various sub-chambers are divided adjacent the outlet portions thereof into separate passageways by walls 12, 12. Ducts 13 provide communication between the various passageways and the spaces 14 to be conditioned. While only three such passageways and spaces have been illustrated in the drawings, it will be understood that the chamber 10 may be divided into as many passageways as is necessary for the particular installation. Dampers 17 and 18 in the chambers 20 and 21, respectively, are connected to an actuating rod 19 which is operated in a manner to be hereinafter set forth. The dampers are so arranged that as the dampers 17 controlling the sub-chamber 20 are moved to closed position, the dampers 18 in the sub-chamber 21 will move towards open position and vice versa. Each of the passageways are controlled by similar dampers as illustrated in Figure 2, only the dampers 17 being illustrated in this figure.

Air is circulated through the chambers 20 and 21, the ducts 13 and the spaces 14 by means of a fan 23 driven by a motor 24. Both fresh and return air are delivered to the fan 23, the fresh air entering through an inlet 25 and return air entering through an inlet 26. Dampers 27 and 28 control the proportions of fresh and return air that are delivered to the fan 23, these dampers being operated in a manner to be described. A relief outlet 29 is provided through which the air from the conditioned spaces may pass when fresh air is admitted to the system and this outlet is controlled by suitable dampers 30. A wall 32 divides the fresh air inlet into separate passageways, one of these passageways being controlled by the dampers 27 and the other passageway being controlled by a manually adjustable damper 34. When the dampers 27 are in fully closed position, a minimum amount of fresh air will be admitted to the system through the passageway controlled by the damper 34, the amount of such air being dependent upon the setting of this damper.

Mounted in the sub-chamber 20 are a pair of heating coils 36 and 37 through which steam or any suitable heating medium flows under the control of valves 38 and 39, respectively. In the sub-chamber 21 are four sets of cooling coils 40, 41, 42, and 43 through which a suitable cooling medium flows under the control of the valves 44, 45, 46, and 47, respectively. The operation of the valves controlling the heating and cooling coils will be described in detail subsequently.

A motor 50 is provided for controlling the position of the fresh air dampers 27, an arm 51 driven by this motor being connected by means of a link 52 to the damper operating arm 53. This motor may be a proportioning motor of the type illustrated in Patent 2,028,110 issued to D. G. Taylor January 14, 1936. The operation of this motor is controlled by a temperature responsive device 54. This device may include a bellows 55 connected by means of a capillary tube 56 to a bulb 57 located on the discharge side of the fan 23. This tube, bulb, and bellows may be filled with a suitable volatile fluid which expands and contracts in accordance with variations in temperature of the air passing over the bulb 57. As the temperature of the air passing over the bulb falls, the bellows contracts and upon a rise in temperature the bellows 55 will be expanded. A lever 58 has an arm 59 biased by means of a spring 60 into engagement with the upper portion of the bellows 55, the other arm 61 of this lever being arranged to move over a resistance 62. As the bellows 55 contracts in response to a fall in temperature of the air leaving the fan 23, lever 61 will move toward the left over the resistance 62 under the influence of the spring 60 and upon a rise in temperature the bellows will cause movement of the lever 61 in the opposite direction. A second temperature responsive device 65 is also provided for controlling the operation of the motor 50. This temperature responsive device includes a bellows 66 connected by means of a capillary tube 67 with a bulb 68 located in the path of fresh air entering the fan 23. This tube, bulb, and bellows are provided with a suitable volatile fluid and biased by means of a spring 70 into engagement with the top of the bellows 66 is a lever 71 pivoted at 72 and carrying a mercury switch 73 having contacts 74, 75, 76, and 77. When the temperature of the air entering the fresh air inlet 25 is below a predetermined value such as 75° F. the mercury switch 73 will be tilted in the direction illustrated whereby the contacts 74 and 75 are connected by the mercury element 78. Upon a rise in temperature of the fresh air above this value the switch 73 will be tilted in the opposite direction whereupon the contacts 76 and 77 will be connected by the mercury element 78. With the switch in the position illustrated the arm 61 of the temperature responsive device 54 is connected to the center terminal 79 of the motor 50 by means of conductors 80, contacts 74 and 75 of the mercury switch 73 and conductor 81. Conductors 82 and 83 connect the extremities of resistance 62 with terminals 84 and 85 of the motor 50. Arm 61 and resistance 62 form a control potentiometer for the motor 50 and it will be understood upon an examination of the above referred to Taylor patent that as the arm 61 moves with respect to resistance 62 in response to variations in temperature of the air leaving the fan 23, motor 50 will cause movement of the arm 51 an amount which is proportional to the change in the air temperature, and this in turn will cause a proportionate movement of the dampers 27. As the temperature of the air decreases, the arm 61 moves to the left over resistance 62. The external resistance across the terminals 79 and 84 of the motor 50 will decrease causing movement of the arm 51 to the right and closing movement of the dampers 27. Upon an increase in the air temperature arm 61 will move toward the right thus decreasing the resistance across the terminals 79 and 85 moving arm 51 toward the left and the dampers 27 toward open position. Thus, upon a rise in the temperature of the air leaving the fan, the dampers move toward open position, and upon a drop in temperature the dampers move towards closed position, the controller 54 maintaining the temperature at about 58° as long as the outdoor temperature does not rise too high. When the temperature of the fresh air rises above 75°, however, the mercury switch 73 is tilted in the opposite direction and contacts 76 and 77 are connected together. The result of this is that there is no external resistance between the terminals 79 and 84, these terminals being connected together as follows: from the terminal 84 through conductor 90, contacts 77 and 76 of the switch 73 and conductor 81 to the terminal 79. The connection between terminal 79 and arm 61 of controller 54 is broken so that this controller now has no effect on the operation of motor 50. The motor 50 will now operate to move the dampers to their entirely closed position so that the only fresh air admitted to the fan 23 is that which passes by the damper 34.

Also operated by the motor 50 is an arm 92 which sweeps over a potentiometer resistance 93, this arm and resistance forming the control potentiometer for a motor 94 similar to the motor 50. The arm 92 is connected by means of conductor 95 to the center terminal of the motor 94 and the extremities of the resistance 93 are connected by means of conductors 97 and 98 to the outer terminals of the motor 94. An arm 100 is driven by the motor 94 and is connected by means of a link 101 to the dampers 28. The arrangement is such that as the dampers 27 are moved towards open position, for example, potentiometer 92 causes motor 94 to operate to move the dampers 28 towards closed position and as the dampers 27 are moved towards closed position damper 28 will move towards open position. The movement of the dampers is such that the same amount of air will be admitted to the fan 23 regardless of the proportions of fresh and return air as controlled by the dampers 27 and 28. Motor 94 also causes operation of an arm 104 over a potentiometer resistance 105, this arm and potentiometer forming the control potentiometer of a proportioning motor 106, this motor including an arm 107 connected by means of a link 108 to the dampers 30. The arm 104 is connected by means of a conductor 110 to the center terminal of the motor 106 and the outer terminals of the motor are connected by means of conductors 112 and 113 to the extremities of resistance 105. The arrangement is such that as the dampers 28 move towards closed position the dampers 30 will move toward open position, or in other words, as the dampers 27 move towards open position allowing additional fresh air to the system the dampers 30 will also move towards open position thus allowing some of the return air to be exhausted from the system so that the total volume of air throughout the system will at all times remain the same.

It will now be seen that the quantities of fresh and return air are varied in accordance with the temperature of the mixed air being discharged from the fan 23 and upon a decrease in this air temperature the amount of fresh air is decreased and the amount of return air is correspondingly increased. The temperature of the air leaving the fan will be maintained at approximately 58° except when the fresh air temperature rises so high that the opening of dampers 27 is ineffective in keeping this temperature at this value. When the temperature of the fresh air reaches 75° the fresh air dampers 27 are entirely closed and dampers 28 will be entirely open, the only fresh air now being admitted to the system being by way of the damper 34 and this minimum quantity of air may be adjusted as desired.

The cooling coils 40 to 43 in the sub-chamber 21 are controlled to maintain a substantially constant temperature of the air leaving these coils. For this purpose a temperature controller 120 is provided, this controller including a bellows 121 connected by means of a capillary tube 122 with a bulb 123 located in the discharge from the sub-chamber 21. This tube, bulb, and bellows may be provided with a suitable volatile fluid so that the bellows 121 will expand or contract as the temperature of the air leaving the sub-chamber 21 varies. An arm 124 of a bellcrank lever 125 is biased by means of a spring 126 into engagement with the top of the bellows 121, and the other arm 127 of this lever is arranged to sweep across a potentiometer resistance 128. It will now be apparent that as the temperature of the air leaving the chamber 21 rises, bellows 121 will expand and cause movement of arm 127 toward the right over resistance 128. The arm 127 is connected by means of a conductor 130 with the center terminal of a proportioning motor 132 similar to the motor 50. The outer terminals of this motor are connected by means of conductors 133 and 134 with the opposite ends of resistance 128. A shaft 136 driven by the motor 132 carries cams 138, 139, 140, and 141. These cams operate switch arms 143, 144, 145, and 146, respectively, these switch arms cooperating with fixed contacts 147, 148, 149, and 150, respectively. As the temperature of the air leaving the chamber 21 rises and arm 127 moves toward the right over resistance 128, motor 132 will cause rotation of shaft 136 an amount proportional to this rise in temperature and switch arms 143, 144, 145, and 146 will be successively moved into engagement with their respective contacts 147 to 150. Solenoids 152, 153, 154, and 155 may be provided for controlling the valves 44 to 47, respectively. For supplying power to these solenoids, lines 160 and 161 connected to a suitable source of power (not shown) are provided.

Upon an initial rise in temperature of the air leaving the sub-chamber 21 the arm 143 will be moved by cam 138 into engagement with the contact 147 thus energizing the solenoid 152 as follows: from the line 160 through conductors 165, 166, switch arm 143, contact 147, conductor 167, solenoid 152, and conductors 168 and 169 to the line 161. Energization of solenoid 152 causes the opening of valve 44 whereupon suitable refrigerant or other cooling fluid is admitted to the cooling coil 40. Should the temperature of the air leaving chamber 21 continue to rise, switch arm 144 will be moved by cam 139 into engagement with contact 148 and the solenoid 153 will be energized through a similar circuit thus opening the valve 45 whereupon coil 41 is provided with a cooling medium. Likewise, the coils 42 and 43 will be successively operated should the temperature of the air leaving chamber 21 continue to rise. As the temperature falls the various solenoids will be successively deenergized and the valves will move to closed positions under the influence of gravity or a suitable biasing means (not shown). It will thus be seen that the temperature of the air leaving the sub-chamber 21 will be maintained at a substantially uniform value which may be, for example, 58°.

The operation of the valve 38 which controls the supply of heating medium to the heating coil 36 located in the heating chamber 20 may be controlled by a proportioning motor 175 similar to the motor 50. The motor 175 is controlled primarily by a temperature responsive device 176 comprising a bellows 177 connected by means of a capillary tube 178 to a bulb 179, this tube, bulb and bellows being filled with a suitable volatile fluid and the bulb 179 being located at the discharge side of the heating chamber 20. A spring 182 biases the arm 183 of a lever 184 into engagement with the upper portion of the bellows 177 and the other arm 185 of the lever is arranged to move over a potentiometer resistance 188 in response to changes in temperature of the air leaving the chamber 20. The right end of resistance 188 is connected by means of conductors 190 and 191 with the lower terminal of the motor 175. The opposite end of the resistance 188 is connected by means of conductors 192 and 193 with the upper terminal of the motor 175 and the arm 185 is connected to the center terminal of the motor 175 by means of a center tapped resistance 196 over which the arm 185 moves conductors 197 and 198. As the temperature of the air leaving the chamber 20 falls, arm 185 moves toward the left over resistance 188, the resistance connected between the upper and center terminals of the motor decreases and motor 175 is operated to open the valve 38, the motor being connected with the valve by means of arm 200 driven thereby and link 201 connecting the arm to the valve.

The control effect of the temperature responsive device 176 is varied in accordance with the temperature of the fresh air entering the system. For this purpose a temperature responsive device 205 is provided, this device comprising a bellows 206 connected by means of a capillary tube 207 to a bulb 208 located in the fresh air inlet, this tube, bulb, and bellows being provided with a suitable volatile fill. The arm 210 of a bell crank lever is biased into engagement with the bellows 206 by means of a spring 212, the other arm 213 of this lever being arranged to move over a resistance 214 in response to variations in temperature of the fresh air. The left end of the resistance 214 is connected by means of conductors 216 and 193 to the upper terminal of the motor 175. The opposite end of resistance 214 is connected by means of conductors 218 and 191 to the lower motor terminal and the arm 213 is connected by means of a conductor 220, a variable resistance 221, and conductors 222 and 198 to the center terminal of the motor 175. It will thus be seen that the arms 185 and 213 and the resistances 188 and 214 of the temperature responsive devices 176 and 205 are connected in parallel to the motor 175 so that each of these devices will exert a control function over the motor. Both of these controllers act to cause an opening of the valve 38 in response to a drop in temperature of the bulbs of these controllers, but since the variable resistance 221 is interposed between the center terminal of the motor 175 and the arm 213 of controller 205, this controller will have less effect on the motor 175 for a given movement thereof than will the arm 185 of the controller 176. In other words, for a movement of arm 213 from one end of the resistance 214 to the opposite end the valve 38 may be moved from open to completely closed position whereas the same result may be accomplished by movement of arm 185 throughout the distance X on the resistance 188. The result of this is that the control range X of the arm 185 will be shifted as the outdoor temperature varies. Thus upon a decrease in the fresh air temperature the control range of the arm 185 will be shifted towards the left so that a higher temperature of the air leaving the chamber 20 will result. By reason of the provision of the center tapped resistance 196 over which the control arm 185 travels the control range X will be of the same length regardless of the position of this control range with respect to resistance 188. The temperatures of the air leaving chamber 20 will be maintained between 80° F. and 110° F. depending upon outdoor temperatures.

Operated by motor 175 is an arm 225 which travels over a resistance 226, this arm and resistance forming a control potentiometer for a proportioning motor 230 having its arm 231 operated thereby connected by means of a link 232 with the valve 39 controlling the flow to the heating coil 37. The opposite ends of this resistance are connected by means of conductors 235 and 236 to the outer terminals of the motor 230 and the arm 225 is connected by means of the conductor 227 to the center terminal of the motor 230. When the arm 225 starts to move on the resistance 226, the motor 230 will be operated to move the valve 39 towards open position. The valve 38 which controls the flow of heating fluid to the coil 36 is made over size so that when this valve is partially open, say, for example, half open, the heating coil 30 will be supplied with the maximum amount of heating fluid it can handle. Further opening movement of this valve will not increase the amount of fluid which passes through the coil 36 but when this valve has been opened to a point where the coil 36 is operating at maximum capacity the arm 225 will start to move over the resistance 226 and if the temperature of the air leaving the chamber 20 continues to fall below the desired value the operation of motor 175 will continue under the control of the controller 176 whereupon the motor 230 will start to open the valve 39 and admit heating fluid to the heating coil 37. It will thus be seen that with this arrangement the heating coils 36 and 37 will be operated in sequence if the heat added to the air by the coil 36 is not sufficient to maintain the desired temperature of the air leaving the heating chamber 20.

Also located in the heating chamber is a spray device 240 for adding moisture to the air when the humidity of the air in the building being conditioned falls below a desired value. Eliminator plates 241 located downstream from the spray device 240 may be provided for removing particles of moisture from the air, these eliminator plates being of any conventional construction. A valve 242 is provided for controlling the supply of moisture to the spray 240, there being a solenoid 243 or other suitable device for controlling the position of this valve. Upon deenergization of the solenoid the valve 242 may be moved to closed position under the influence of gravity or any suitable biasing means (not shown).

The energization of the solenoid 243 is controled by a relay 250, this relay including opposed relay coils 251, 252, an armature 253, operating arms 254 and 255 cooperating with fixed contacts 256 and 257, respectively. Power may be supplied to this relay through a suitable transformer 260. When the relay coil 251 is energized, the arms 254 and 255 are moved into engagement with their respective contacts and upon deenergization of this relay coil the arms move out of engagement with their respective contacts under the influence of gravity or any suitable biasing means.

The energization of the relay coil 251 is controlled by means of a second relay 265, this relay including opposed balanced coils 266 and 267, an armature 268 controlling the position of a switch arm 269 which cooperates with fixed contacts 270 and 271. When relay coils 266 and 267 are equally energized the armature 268 remains in the mid position illustrated and the arm 269 is in engagement with neither contact 270 nor 271. When the coil 266 is energized more highly than the coil 267, the arm 269 is moved into engagement with the contact 270 and when the coil 267 becomes more highly energized than the coil 266 the arm 269 is moved into engagement with the contact 271.

The energization of the relay 265 is controlled primarily by a humidity responsive device 275. This device may include a humidity responsive element 276 fixed at one end and being connected at its other end to a lever 277 pivoted at 278 and biased by means of a spring 279 in a direction to elongate the humidity responsive element 276. The element 276 may be located in the path of return air passing through the inlet 26 so that this device will respond to the average humidity existing in the various rooms or zones within the building. Upon an increase in humidity, the element 276 will become elongated whereupon the spring 279 will cause upward movement of the right end of lever 277 and upon a decrease in the humidity the contraction of the element 276 will cause opposite movement of the arm 277. The right end of this arm is arranged to move over a resistance 282, the upper end of this resistance being connected by means of conductors 283 and 284 to the outer end of the relay coil 267. The lower end of the resistance 282 is connected by means of conductors 286 and 287 to the outer end of the relay coil 266. The junction of the relay coils 266 and 267 is connected by means of conductors 290, 291, and the center tapped resistance 292 to the arm 277. The outer end of the coil 267 is connected by means of conductors 295, 296 to one side of the secondary 297 of a step-down transformer 298. The outer end of the coil 266 is connected by means of conductors 300 and 301 to the opposite end of the secondary 297. The primary 299 of the transformer 298 is connected to the load side of a starting box 305 which controls the operation of the fan motor 24, this starting box being connected to the conductors 160 and 161 by means of conductors 306 and 307, respectively. When the motor 24 is in operation power will be supplied to the transformer 298 and accordingly to the relay 265 by means of the secondary 297.

It will now be seen that the relay coils 266 and 267 are connected in parallel with the potentiometer composed of the arm 277 and resistance 282. Movement of the arm 277 downwardly over the resistance 282 in response to a decrease in the relative humidity of the air passing over the element 276 will have the effect of decreasing the resistance in series with the relay coil 267 and increasing the resistance in series with the coil 266 whereupon the relay coil 267 becomes more highly energized than coil 266 and arm 269 is moved into engagement with the contact 271. The engagement of arm 269 with the contact 271 will cause current to flow through the relay coil 251 of the relay 250 as follows: from the transformer 260 through conductors 310, 311, contact 271, arm 269, conductors 312, 313, relay coil 251, and conductor 314 back to the transformer 260. Energization of the coil 251 causes movement of arms 254 and 255 into engagement with the contacts 256 and 257. Upon movement of arm 255 into engagement with contact 257 the solenoid 243 controlling the valve 242 of the spray is energized as follows: from one side of secondary 297 of the transformer 298, through conductors 316, 317, arm 255, contact 257, conductor 320, solenoid 243 and conductors 321 and 301 to the other side of the secondary 297. Valve 242 is now opened and water issues from the spray 240 to increase the humidity of the air leaving the heating chamber 20.

The engagement of arm 254 of the relay 250 with contact 256 closes a holding circuit through the relay coil 251 which is independent of the engagement of the arm 269 of relay 265 with the contact 271, this circuit being as follows: from the side of the transformer 260 through conductor 310, contact 256, arm 254, conductor 313, relay coil 251 and conductor 314 to the other side of the transformer 260. Accordingly the coil 251 of relay 250 will remain energized even though the humidity of the air passing over the controller 275 rises so that arm 277 moves upwardly to a point such that the relay coils 266 and 267 again become equally energized and the arm 269 moves out of engagement with contact 271. Upon a further increase in relative humidity, the arm 277 operated by the humidity responsive element 276 will move upwardly until the resistance in series with the relay coil 267 becomes higher than the resistance in series with relay coil 266 so that the coil 266 becomes more highly energized than the coil 267 and armature 268 moves to the left moving switch arm 269 into engagement with the contact 270. Current now flows through the relay coil 252 as follows: from the transformer 260 through conductors 310, contact 256, switch arm 254, conductor 312, switch arm 269, contact 270, conductor 325, the relay coil 252 and conductors 326 and 314 to the other side of the transformer 260. The energization of coil 252 counteracts the effect of coil 251 on the armature 253 since the coil 252 has a bucking effect on coil 251. Switch arms 254 and 255 now move out of engagement with the contacts 256 and 257 under the influence of gravity or other biasing means whereupon the circuit through solenoid 243 of the water spray valve 242 is interrupted. Since the circuit through the relay coil 252 included the contacts 256 and 254, this circuit is interrupted when the arm 254 moves away from contact 256 and the relay coil 251 will not again be energized until the humidity of the air flowing over the element 276 drops to a low enough value so that the arm 269 of relay 265 is again moved into engagement with the contact 271. It will thus be seen that the valve 242 is operated in accordance with the humidity of the air passing through the return duct 26 to maintain the humidity of the air within that duct at certain predetermined values.

The humidity at which the air is maintained may be varied in accordance with outdoor temperature so that when the temperatures fall low enough, frosting of the windows, etc., will not take place. For this purpose, a temperature controller indicated generally by the reference character 330 is provided, this controller including bellows 331 connected by means of a capillary tube 332 to a bulb 333 located in the fresh air inlet 25, this tube, bulb, and bellows being provided with a suitable volatile fluid. The arm 335 of a bell crank lever is biased by means of a spring 336 into engagement with the upper portion of the bellows 331, the other arm 337 of this lever being arranged to sweep over a resistance 340 in response to variations in fresh air temperature. As the temperature of the air entering the inlet 25 decreases the arm 337 will be moved toward the left by reason of the contraction of the bellows 331. This resistance 340 is connected in parallel with the resistance 282 and the relay coils 266 and 267. The left end of this resistance is connected by means of conductors 341 and 284 to the extremity of the relay coil 267 and the right end of this resistance is connected by means of conductors 342 and 287 to the left end of the coil 266. The arm 337 of controller 370 is connected by means of conductor 345, a variable resistance 346, conductor 347, and conductor 290 to the junction of the coils 266 and 267. As the outdoor temperature decreases, the arm 337 moves to the left. The resistance in series with the relay coil 266 decreases and this coil becomes more highly energized than the coil 267 whereupon arm 269 is attracted to the left, the engagement of this arm with contact 270 causing closing of the water valve 242 as explained above. It is therefore apparent that upon a decrease in humidity of the air passing over the element 275 the water valve 242 is opened to supply humidity to the air passing through the chamber 20 but as the temperature of the outdoor air decreases the water valve is moved to closed position. The provision of the adjustable resistance 346 in the circuit to the arm 337 of the controller 330 has the effect of desensitizing this arm so that this arm must move throughout the entire range of the resistance 340 to have the same effect as movement of arm 277 of the controller 275 throughout the distance X so that the controller 330 has the effect of shifting the control range of the controller 275 to maintain different humidities of the air in the various zones being conditioned in accordance with the outdoor temperatures. As the outdoor temperature drops, a lower humidity will be maintained in the various zones to prevent frosting of the window panes, etc. The provision of the center tapped resistance over which the control arm 277 moves insures that the control range of this arm will always have the same length regardless of the position of this control range.

The position of the dampers 17 and 18 in each of the pasageways through the air conditioning chamber are controlled by proportioning motors 350 there being one of these motors for each set of dampers 17 and 18 as will be seen in Figure 2. The motors 350 include arms 351 driven thereby and connected by means of links 352 to the arms 19 to which the dampers 17 and 18 are connected. As the arm 351 moves upwardly dampers 17 are moved towards closed position and dampers 18 are moved towards open position. Upon movement of the arm 351 in the opposite direction a reverse movement of the dampers 17 and 18 takes place.

Located in each of the zones 14 are thermostats 360 for controlling the operation of the motors 350. These thermostats may be of any suitable construction and are illustrated as comprising a bimetallic element 361 to which is connected an arm 362 which is moved thereby in response to variations in temperature in the space being conditioned. Upon a rise in temperature within the space arm 362 is moved toward the right and upon a drop in temperature the arm 362 moves toward the left. The arm 362 is arranged to move over a resistance 365, the right end of this resistance being connected by means of conductors 366 and 367 to the motor terminal 370. The opposite end of the resistance 365 is connected by means of conductors 372 and 373 to the motor terminal 375. The center terminal 376 of the motor is connected by means of conductors 378, 379, and the center tapped resistance 380 to the arm 362 of the thermostat 360. As the temperature within the space 14 increases, the arm 362 moves toward the right and the motor 350 is operated to move dampers 17 towards closed position and move the dampers 18 towards open position and upon a drop in temperature within the space the dampers are moved in reverse directions.

The control range of the thermostats are varied by the potentiometers 400, these potentiometers including resistances 401 and control arms 402 mounted on a shaft 403 driven by a proportioning motor 404. The operation of the motor 404 is controlled by a temperature controller 405 including a bellows 406 connected by the capillary tube 407 to the bulb 408 located in the fresh air inlet 25. The bellows 406 controls the position of an arm 410 which is connected to a pivoted arm 411 biased by a spring 412 into engagement with the top of the bellows 406. The arm 410 sweeps over a resistance 415 having its ends connected by means of conductors 416 and 417 to the outer terminals of the motor 404, the arm 410 being connected by means of conductor 418 to the center terminal of the motor 404. It will now be understood that as the fresh air temperature varies the motor 404 will be operated accordingly and will cause movement of the potentiometer arms 402 with respect to resistances 401. These resistances 401 are connected in parallel with the resistances 365 of the thermostats 360 to the motors 350. Thus referring to Figure 2 it will be seen that the upper end of resistance 401 is connected by means of conductors 420 and 373 to the terminal 375 of the motor 350. The lower end of resistance 401 is connected by means of conductors 422 and 367 to the terminal 370 and the arm 402 is connected by means of the adjustable resistance 425, conductors 426 and 378 to the terminal 376. The potentiometers 400 serve to adjust the control range X of the thermostat 360, these potentiometers having less effect on the motor 350 than the thermostats by reason of the adjustable resistances 425 interposed in the circuits to the control arms 402. Since the arms 402 move in response to variations in outdoor temperature the temperatures maintained in the zones or spaces 14 will depend upon the outdoor temperature and the arrangement is such that as the outdoor temperature increases the temperature maintained in the zones will increase and conversely lower temperatures will be maintained in the zones as the outdoor temperature decreases during the cooling season. During the heating season, or in other words, when the outdoor temperature drops to a low enough value as for example, 60° F., controllers 402 will have moved to the end of their potentiometers so that the temperature maintained in the space will not decrease below a certain value regardless of how low the outdoor temperature falls. In this way the temperature of the spaces or zones is maintained relatively high at high outdoor temperatures in the summertime according to a predetermined schedule in order to secure the maximum conditions of comfort.

To review the operation of the system, the air admitted to the air conditioning chamber will be kept at a substantially constant predetermined value as for example 58° F., when the outdoor temperature is not too high, by means of the temperature controller 54 by regulating the settings of the fresh and return air dampers, and when the outdoor temperature rises above a certain value such as 75° the fresh air dampers 27 will be entirely closed whereby a minimum amount of fresh air only is admitted to the system. The temperature of the air leaving the cooling coils 40 to 43, inclusive, will be maintained at a predetermined value such as 58° by controlling the valves which admit cooling fluid to these coils by the controller 121. It will be understood that as long as the temperature of the air leaving the fan 23 is not above 58°, the cooling coils will not be operating. The temperature of the air leaving the heating coils will be maintained at a value which will depend upon outdoor temperatures by means of the controller 176 whose control range will be varied by the controller 205 responsive to fresh air temperatures. During the winter time the temperature of the air leaving the chamber 20 will be maintained between 80 and 110° F., for example, depending upon the outdoor temperatures, the lower the outdoor temperatures the higher the temperature of the air leaving the chamber 20. During the summer, when the temperature of the air leaving the fan is above 80° F., the heating coils will not be operating. The humidity of the air in the zones is controlled by the spray 240 which is in turn controlled by the humidity responsive device 275, the control range of this device being adjusted in accordance with outdoor temperatures so that as the outdoor temperature drops the control range of this humidity controller will vary to maintain a lower humidity in the spaces or zones being conditioned thereby preventing the formation of frost on window panes, etc. when the outdoor temperatures become very low. Thus, only during the seasons when the temperature of the air leaving the fan 23 is between 58° F. and 80° F. will both the heating and cooling means operate simultaneously. At all other times, only one of the means will be in operation at any time, and the temperature of the spaces is controlled by controlling the amount of air being by-passed around the temperature changing means in operation, the chamber housing the temperature changing means not in operation serving as a by-pass for the other chamber. In other words, when the outdoor temperature is low enough, there is no need to operate the cooling means, the necessary cooling for any zone being effected by the mixture of this air and the return air, and likewise, when the outdoor temperature is sufficiently high, there is no necessity for operating the heating means.

Since now the air leaving the chambers 20 and 21 is maintained at certain values the air being delivered to the various zones may be controlled by varying the proportions of the air admitted to the zones by adjustment of the dampers 17 and 18. Thus it may be desirable to maintain different temperatures in some zones than in others and the heating and cooling loads in the various zones may be so divergent that cooling may be required in one zone whereas heating may be required in another zone and this is readily effected by properly controlling the dampers 17 and 18 for each zone.

It will thus be seen that I have devised a very convenient and relatively simple air conditioning system whereby the condition of the air in a number of different zones in a building is effectively controlled even though one zone may be requiring cooling while at the same time a different zone is requiring heating. Having described a preferred form of my invention many modifications may become apparent to those skilled in the art and it should be understood that my invention is limited only by the scope of the appended claims.

I claim as my invention:

1. In an air conditioning system for a plurality of zones, means for maintaining the temperature of a volume of air at a substantially constant predetermined value, means for maintaining the temperature of a different volume of air at a different predetermined value, means for humidifying one of said volumes of air, means responsive to the humidity of the air in said zones in control of the humidifying means, and means responsive to the temperature of the air in each zone for controlling the relative amounts of the two volumes of air admitted to each zone.

2. In an air conditioning system for a plurality of zones, means for maintaining the temperature of one volume of air at a substantially constant predetermined value, means for maintaining the temperature of another volume of air at a predetermined temperature range and within said range at a value which is dependent upon outdoor temperatures, means for humidifying one of said volumes of air, means responsive to the humidity of the air in said zones and the outdoor temperature in control of the humidifying means, and means responsive to the temperature of each zone and the outdoor temperature for controlling the relative amounts of the two volumes of air admitted to each zone.

3. In an air conditioning system, an air conditioning chamber, means dividing said chamber into parallelly arranged passageways, heating means in one of said passageways, cooling means in other of said passageways, circulating means for circulating air through said chamber and through a space to be conditioned, means for admitting fresh and return air to said circulating means, means for controlling the proportions of fresh and return air to maintain the temperature of the air entering said chamber at a predetermined value as long as the fresh air temperature is sufficiently low, means for controlling the operation of the cooling means in a manner to maintain the temperature of the air leaving the cooling means at a value which is not lower than said first predetermined value, means for controlling the heating means in a manner to maintain the temperature of the heating means at a value which is higher than said last named value, and means responsive to the temperature of the space for controlling the relative amounts of air circulated through the two passageways.

4. In an air conditioning system, an air conditioning chamber, means dividing said chamber into parallelly arranged passageways, heating means in one of said passageways, cooling means in another of said passageways, means for circulating air through the passageways and through a space to be conditioned, damper means in control of each of said passageways for regulating the relative amounts of air passing through each of said passageways into said space, means responsive to conditions in the space being conditioned controlling the positions of said damper means, means responsive to the temperature of the air leaving said heating means in control of the heating means to prevent the temperature of the air leaving the heating means from dropping below a predetermined value, means responsive to the temperature of the air leaving the cooling means in control of the cooling means to maintain the air leaving the cooling means at or below a predetermined value, means for admitting a controllable mixture of fresh and return air to said heating and cooling means, and means responsive to the mixture of fresh and return air entering said chamber for controlling the relative amounts of fresh and return air admitted thereto in a manner to maintain the temperature of the mixture at substantially the same value as the temperature of the air leaving the cooling means is maintained, whenever possible, so that the cooling means is operated only when necessary in view of the high fresh air temperature and fluctuations of the load on the heating means are minimized.

5. In an air conditioning system, an air conditioning chamber, means dividing said chamber into parallelly arranged passageways, heating means in one of said passageways, cooling means in another of said passageways, means for circulating air through the passageways and through a space to be conditioned, damper means in control of each of said passageways for regulating the relative amounts of air passing through each of said passageways into said space, means responsive to conditions in the space being conditioned controlling the positions of said damper means, means responsive to the temperature of the air leaving said heating means in control of the heating means to prevent the temperature of the air leaving the heating means from dropping below a predetermined value, means responsive to the temperature of the air leaving the cooling means in control of the cooling means to maintain the air leaving the cooling means at or below a predetermined value, means for admitting a controllable mixture of fresh and return air to said heating and cooling means, means responsive to the mixture of fresh and return air entering said chamber for controlling the relative amounts of fresh and return air admitted thereto in a manner to maintain the temperature of the mixture at substantially the same value as the temperature of the air leaving the cooling means is maintained, whenever possible, so that the cooling means is operated only when necessary in view of the high fresh air temperature and fluctuations of the load on the heating means are minimized, and means rendering said mixed air temperature responsive means ineffective and reducing to a minimum the admission of fresh air in response to a rise in outdoor temperature to a predetermined value.

6. In an air conditioning system, an air conditioning chamber, means dividing said chamber into parallelly arranged passageways, heating means in one of said passageways, cooling means in another of said passageways, means for circulating air through the passageways and through a space to be conditioned, damper means in control of each of said passageways for regulating the relative amounts of air passing through each of said passageways into said space, means responsive to conditions in the space being conditioned controlling the positions of said damper means, means responsive to the temperature of the air leaving said heating means in control of the heating means to prevent the temperature of the air leaving the heating means from dropping below a predetermined value, means responsive to the temperature of the air leaving the cooling means in control of the cooling means to maintain the air leaving the cooling means at or below a predetermined value, means for admitting a controllable mixture of fresh and return air to said heating and cooling means, means responsive to the mixture of fresh and return air entering said chamber for controlling the relative amounts of fresh and return air admitted thereto in a manner to maintain the temperature of the mixture at substantially the same value as the temperature of the air leaving the cooling means is maintained, whenever possible, so that the cooling means is operated only when necessary in view of the high fresh air temperature and fluctuations of the load on the heating means are minimized, and means responsive to outdoor temperature for adjusting the temperature at which the air leaving the heating means is maintained.

7. In a year round air conditioning system for a plurality of zones some of which may at times require heating while others simultaneously require cooling in order to maintain the desired conditions of temperature in the various zones, a common heating means for all of said zones, a common cooling means for all of said zones, means for causing a flow of air over the heating means and over the cooling means, means responsive to the temperature of the air leaving the heating means in control of the heating means to maintain the temperature of the air leaving said heating means above a predetermined value, means responsive to the temperature of the air leaving the cooling means in control of the cooling means to maintain the temperature of the air leaving the cooling means below a predetermined value, duct means for delivering the air leaving the heating means and the cooling means to the various zones, and means responsive to the temperature of each zone for controlling the relative amounts of the air leaving the heating means and the cooling means admitted to the respective duct means whereby any desired temperature may be maintained in each of said zones at all times by the use of a common heating means and a common cooling means for all of said zones.

8. In a year round air conditioning system for a plurality of zones some of which may at times require heating while others simultaneously require cooling in order to maintain the desired conditions of temperature in the various zones, a common heating means for all of said zones, a common cooling means for all of said zones, means for admitting a mixture of return air from the various zones and fresh outside air to the heating means and the cooling means, means for controlling said mixture in a manner to maintain the temperature of the air admitted to the heating and cooling means at or below a predetermined value whenever possible and reducing the amount of fresh air to a minimum whenever the outside temperature rises to such a value that it is not possible to maintain the mixed air temperature at or below this predetermined value, means controlling the cooling means to maintain the temperature of the air leaving the cooling means at said predetermined value, operation of the cooling means being rendered unnecessary when it is possible to maintain said predetermined value by controlling the mixture of fresh and return air, means controlling the heating means to maintain the temperature of the air leaving the heating means at a predetermined value, and means responsive to the temperature of each zone for controlling the relative amounts of the air leaving the heating means and the cooling means admitted to the respective duct means whereby any desired temperature may be maintained in each of said zones at all times by the use of a common heating means and a common cooling means for all of said zones.

9. In a year round air conditioning system for a plurality of zones some of which may at times require heating while others simultaneously require cooling in order to maintain the desired conditions of temperature in the various zones, a common heating means for all of said zones, a common cooling means for all of said zones, means for causing a flow of air over the heating means and over the cooling means, a humidifying means in the path of air flowing over the heating means, means responsive to the temperature of the air leaving the heating means in control of the heating means to maintain the temperature of the air leaving the heating means above a predetermined value, means responsive to the temperature of the air leaving the cooling means in control of the cooling means to maintain the temperature of the air leaving the cooling means below a predetermined value, duct means for delivering the air leaving the heating means and the cooling means to the various zones, means responsive to the humidity of the air leaving the zones in control of the humidifying means, and means responsive to the temperature of each zone for controlling the relative amounts of the air leaving the heating means and the cooling means admitted to the respective duct means whereby any desired temperature may be maintained in each of said zones at all times by the use of a common heating means and a common cooling means for all of said zones.

10. A conditioning system comprising in combination, a zone, means for maintaining the temperature of a volume of air at a substantially constant predetermined value, means for maintaining the temperature of a different volume of air at a different predetermined value, and means for controlling the temperature of the air in said zone by controlling the relative amounts of the said two volumes of air admitted to the zone.

11. A conditioning system comprising in combination, a zone, means for maintaining the temperature of a volume of air within a predetermined temperature range and at a value within said range dependent upon outdoor temperature, means for maintaining the temperature of a different volume of air at a substantially constant predetermined value that is not within said predetermined temperature range, and means for controlling the temperature of the air in said zone by controlling the relative amounts of the said two volumes of air admitted to the zone.

GEORGE D. GULER.